US006758347B2

(12) United States Patent
Kao

(10) Patent No.: US 6,758,347 B2
(45) Date of Patent: *Jul. 6, 2004

(54) ELECTRICALLY CYCLING CD RACK

(76) Inventor: Kuo-Ming Kao, 23F-3, No. 508, Sec. 5, Chung-Hsiao E. Rd., Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 10/196,371

(22) Filed: Jul. 17, 2002

(65) Prior Publication Data

US 2003/0127403 A1 Jul. 10, 2003

Related U.S. Application Data

(63) Continuation-in-part of application No. 10/038,620, filed on Jan. 8, 2002, now Pat. No. 6,543,628.

(51) Int. Cl.[7] .......... A47G 29/00

(52) U.S. Cl. .......... 211/40; 211/21

(58) Field of Search .......... 211/40, 41.12, 211/121, 163, 1.57, 1.52; D6/630; 206/308.1

(56) References Cited

U.S. PATENT DOCUMENTS 718,752 A * 1/1903 Findley .......... 211/126.1
887,282 A * 5/1908 Smith .......... 211/121
1,013,015 A * 12/1911 Herman .......... 312/36
2,869,708 A * 1/1959 Nesseth .......... 198/802
2,969,867 A * 1/1961 McClelland .......... 198/385
3,722,743 A * 3/1973 Atchley .......... 221/77
4,026,617 A * 5/1977 Bosio et al. .......... 312/268
4,941,570 A * 7/1990 Kruger et al. .......... 206/267
5,255,773 A * 10/1993 Pollock .......... 198/347.3
5,559,575 A * 9/1996 King .......... 396/618
5,672,512 A * 9/1997 Shaw .......... 436/46
6,202,861 B1 * 3/2001 Mah .......... 211/40

* cited by examiner

*Primary Examiner*—Daniel P. Stodola
*Assistant Examiner*—Khoa Tran
(74) *Attorney, Agent, or Firm*—Troxell Law Offices PLLC

(57) ABSTRACT

An electrically cycling multi-media CD rack comprising a main framework, a gearing device and at least a clamping seat belt. The gearing device is connected to the main framework. The clamping seat belt is integrally formed and has multiple mutually linked clamping seats. The clamping seats are connected mutually, and the clamping seat belt is mounted around the gearing device to complete the electrically cycling multi-media CD rack with a lower cost of production.

3 Claims, 4 Drawing Sheets 20 24 21 22 23 25 30 10 11 21 10

ELECTRICALLY CYCLING CD RACK

CROSS REFERENCE OF RELATED APPLICATION

This is a continuation-in-part application of the applicant's U.S. patent application having a Ser. No. 10/038,620 and a filing date of Jan. 8, 2002, now U.S. Pat. No. 6,543,628.

BACKGROUND OF THE INVENTION

1. Field of the Invention

The present invention is related to an electrically cycling multi-medium CD rack, and especially to an electrically cycling multi-medium CD rack convenient for displaying and viewing, it suits the structures for displaying CD's, VCD's or DVD's or the like.

2. Description of the Prior Art

Since CD's with higher quality, larger storage capacity as well as longer life span were widely used to substitute for the old magnetic disks and recording tapes etc., the way of storing CD's has been always thought highly of by manufacturers and users, CD storage and arrangement devices thereby have been developed.

The types of CD racks are most variant; however, most conventional CD racks each is provided therein with a storing room for mounting a CD casing, an edge of the storing room is provided with two hooks, while the other opposite edge is provided with corresponding engaging areas, a CD casing is fixed in a receiving chamber recessed and provided in the storing room. The four walls of a CD rack are provided respectively with two sets of dovetail grooves and dovetail blocks; by engaging the dovetail blocks in the dovetail grooves on other CD racks, a plurality of CD racks can be connected mutually. Although multiple CD's can be simultaneously displayed in these CD racks, they occupy quite a large volume, and the space for displaying CD's is relatively limited. The positions of displaying are either overly high or overly low and make inconvenient viewing or taking off and placing in. Hence such CD racks are disadvantageous in occupying large areas, limited displaying positions as well as small amount of CD's stored for displaying in the CD racks.

SUMMARY OF THE INVENTION

The primary object of the present invention is to provide an electrically cycling multi-medium CD rack with a clamping seat belt integrally formed and having thereon multiple mutually linked clamping seats, the CD rack can make the cost of production reduced.

Another object of the present invention is to provide an electrically cycling multi-medium CD rack; the CD rack can make assembling thereof easy and convenient.

To achieve the above stated objects, the present invention is comprised of a main framework, a gearing device and at least a clamping seat belt. The gearing device is provided in the main framework, and is provided with positioning boards, a motor and a gear set. The positioning boards are connected with supporting boards. The clamping seat belt is integrally formed and has thereon multiple mutually linked clamping seats, the clamping seat belt is provided on an upper and a lower end thereof with a plurality of engaging members, and is provided at the two lateral edges on the back side thereof with a lot of stubs to be engaged with gears. The upper and the lower ends of the clamping seat belt can be engaged to make the clamping seat belt an annular belt surrounding the gearing device. The stubs on the back side of the clamping seat belt are engaged with the gears to make rotation of the clamping seat belt together with the gearing device. In this mode, the electrically cycling multi-medium CD rack with an effect of convenient assembling, high storing capacity as well as reducing the cost of production can be provided.

The present invention will be apparent in its features and structure after reading the detailed description of the preferred embodiment thereof in reference to the accompanying drawings.

DETAILED DESCRIPTION OF THE PREFERRED EMMBODIMENT

Figure 2:
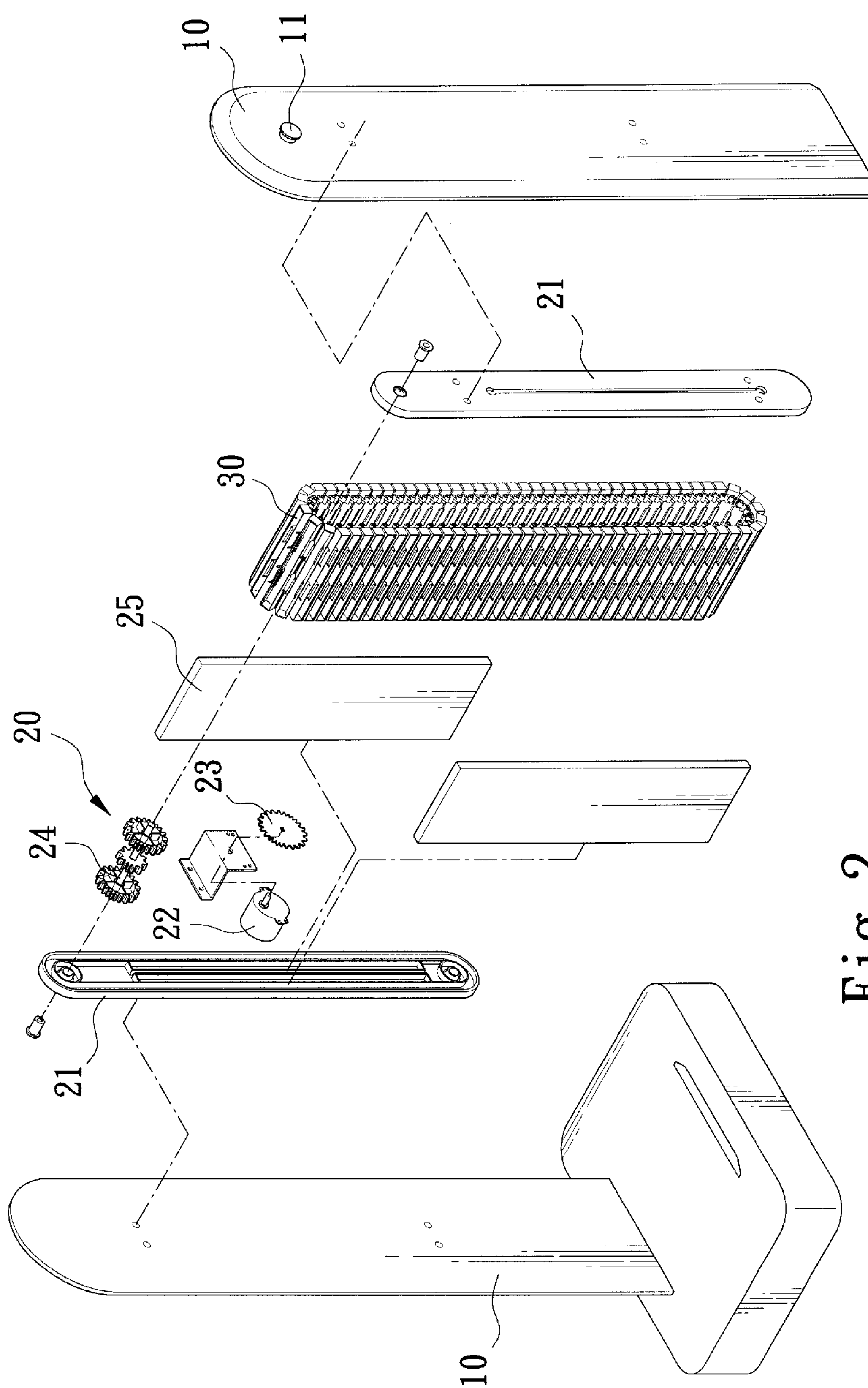
FIG. 2 is an explosion view showing the elements of an embodiment of the present invention.

Referring to FIG. 2, the electrically cycling multi-medium CD rack of the present invention is comprised of a main framework 10, a gearing device 20 and at least a clamping seat belt 30.

Wherein, the main framework 10 can be any of various modeling; in this embodiment, it includes a base and two lateral plates. The gearing device 20 is provided between the two lateral plates, and is provided with two positioning boards 21, a motor 22, a gear-set axle 24 and two supporting boards 25. The positioning boards 21 are elongate with rounded ends and are coincident with the main framework 10 by length. The two positioning boards 21 are fixed respectively on the two lateral plates of the main framework 10, the upper ends thereof are movably and pivotally connected to the gear-set axle 24 which has three mutually linked gears. A motor 22 is provided near the gear-set axle 24, and is provided on the axle thereof with a gear 23; the gear 23 is engaged with the middle of the three gears of the gear-set axle 24. The two supporting boards 25 are mounted between the two positioning boards 21.

Figure 3:
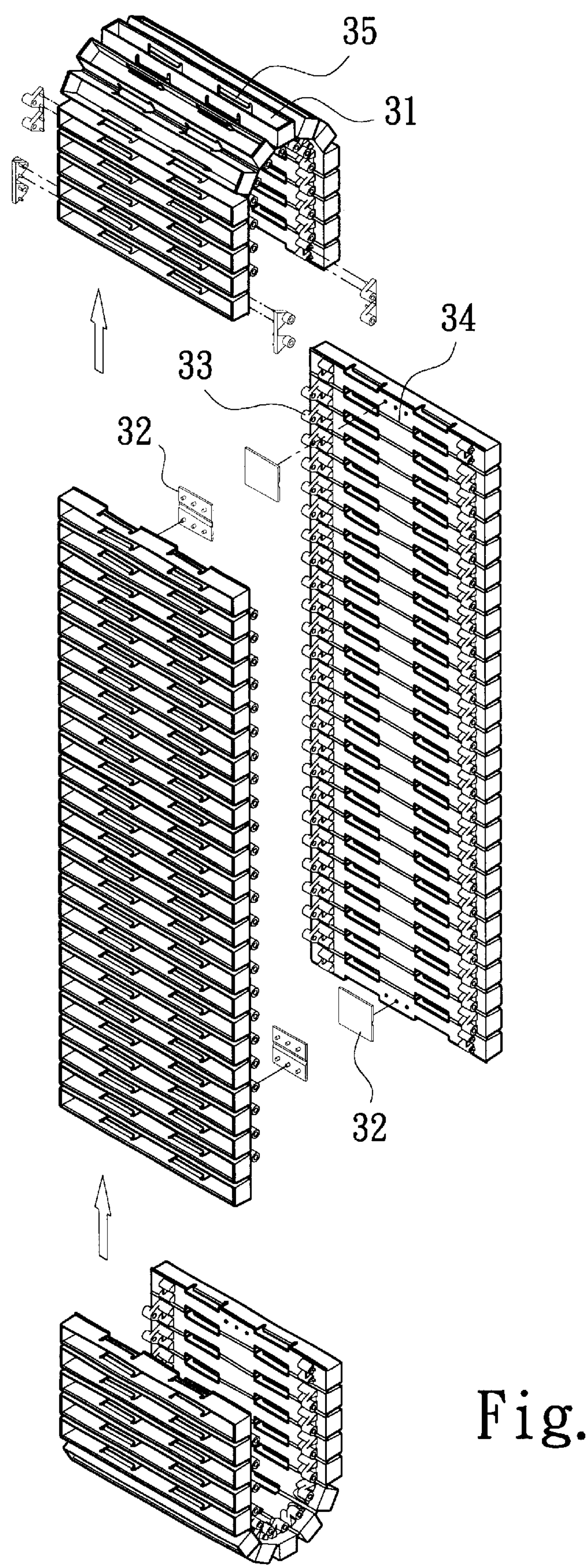
FIG. 3 is a schematic view showing the elements of a clamping seat of the embodiment of the present invention.

As shown in FIG. 3, the abovementioned at least a clamping seat belt 30 is integrally formed and has thereon multiple clamping seats 31. The clamping seats 31 are connected mutually on the backs thereof by providing hinges 34, so that they are not separated; each clamping seat 31 is provided with two recessed engaging portions 35 laterally of the middle point thereof. The clamping seat belt 30 is provided on an upper and a lower end thereof with a plurality of engaging members 32, and is provided at the two lateral edges on the back side thereof with a lot of stubs 33 to be engaged with the two lateral gears of the gear-set axle 24.

Figure 1:
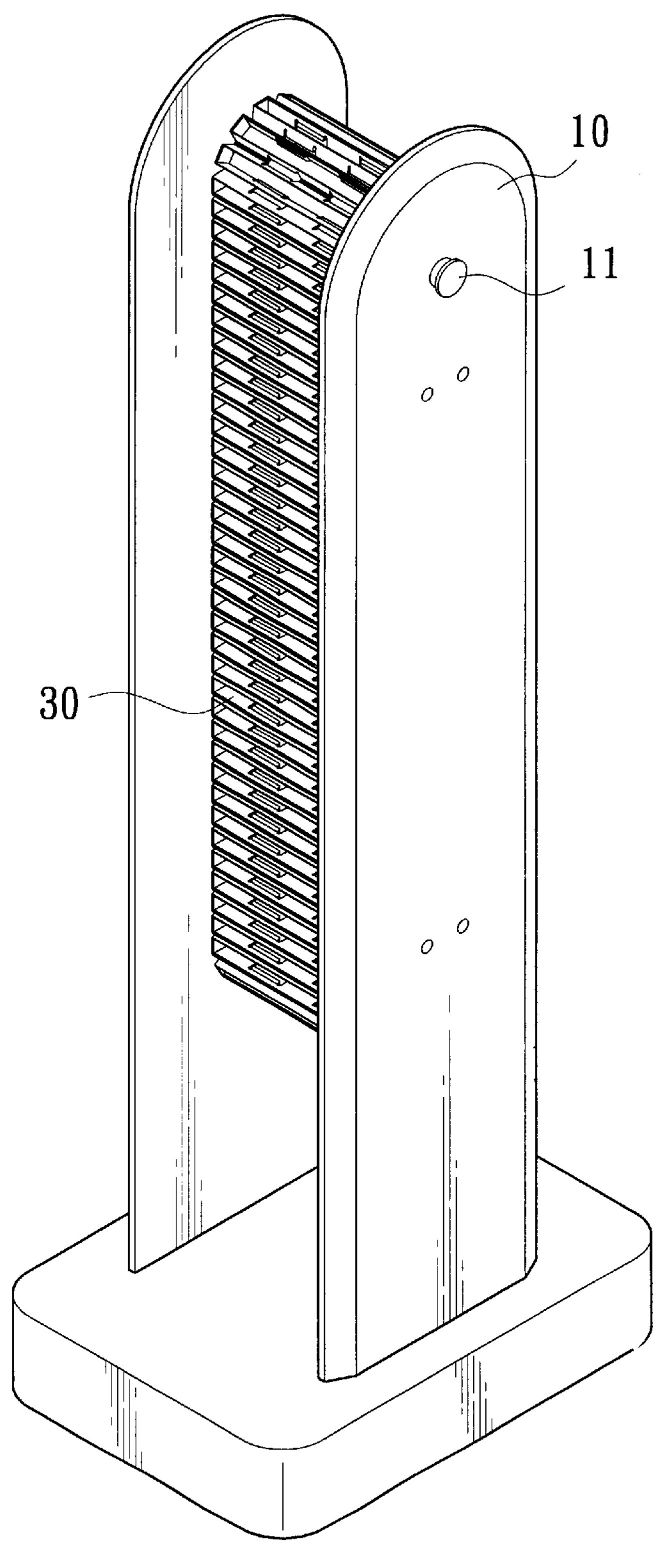
FIG. 1 is a perspective view showing the appearance of the present invention.
Figure 4:
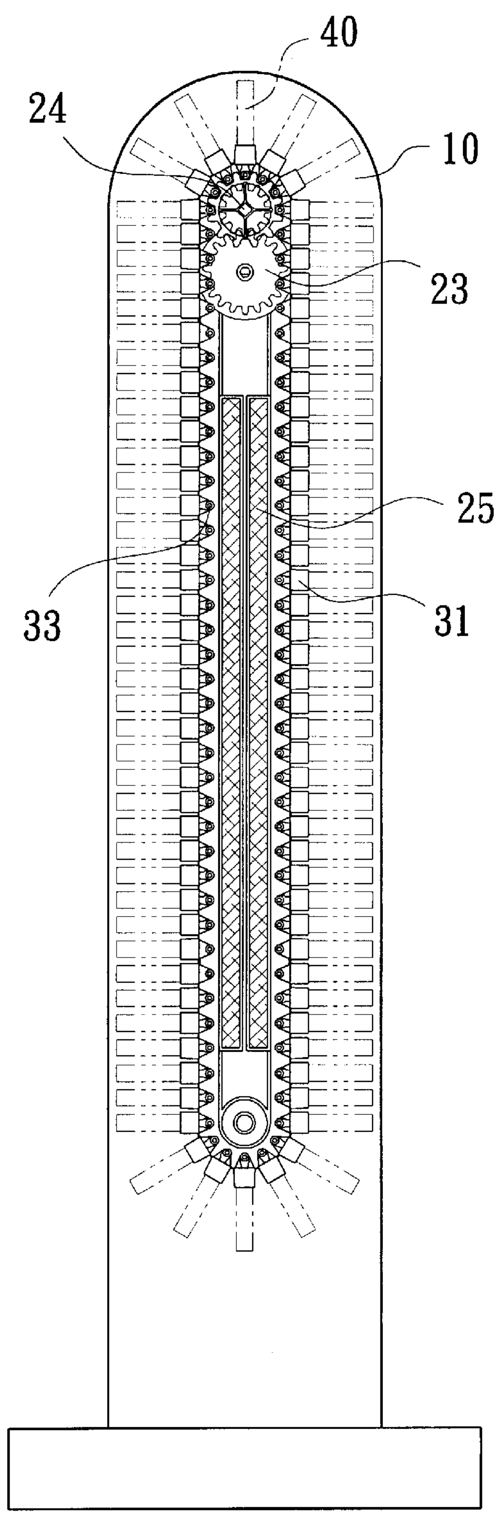
FIG. 4 is a sectional view showing use of the embodiment of the present invention.

When in packaging, the two positioning boards 21 and the motor 22 have been connected with the two lateral plates of the main framework 10. Therefore, after purchasing by a consumer, he needs only to connect the two supporting boards 25 with the two positioning boards 21 of the main framework 10, then to engage the engaging members 32 provided on the upper and lower ends of the clamping seat belt 30 and to have the clamping seat belt 30 mounted around the gearing device 20. Now, the stubs 33 on the back side of the clamping seat belt 30 and the gear-set axle 24 on the upper ends of the two positioning boards 21 are mutually engaged. In this state, it needs only to turn on a power switch 11 of the motor 22 to rotate the motor 22, and the gear 23 on the axle of the motor 22 will rotate the gear-set axle 24, and the clamping seat belt 30 engaged with the gear-set axle 24 is started to rotate, thereby, cycling of the clamping seat belt 30 is effected (as shown in FIG. 1). The multi-medium CD's placed in the clamping seats 31 will not drop during rotation by engagement of the two engaging portions 35 provided in each clamping seat 31 (referring to FIG. 4).

The present invention has the following advantages:

1. The present invention is provided with a clamping seat belt integrally formed and having thereon multiple mutually linked clamping seats, it can make the cost of production reduced.
2. The clamping seat belt integrally formed and having thereon multiple mutually linked clamping seats of the present invention needs not to connect the clamping seats one by one for assembling; this can reduce the work of assembling and thereby increase convenience of assembling.
3. The clamping seat belt having thereon multiple mutually linked clamping seats of the present invention can increase the capability for displaying and storage.

In conclusion, the present invention can reduce the work of assembling and the cost of production, it has never been published or publicly used.

Having thus described my invention with the above stated effects, what I claim as new and desire to be secured by Letters Patent of the United States are:

1. An electrically cycling multi-media CD rack comprising:

a) a main framework having a base, a first lateral plate, and a second lateral plate, the first and second lateral plates being spaced apart and extending from a top of the base;

b) a gearing device having:

i) first and second positioning boards, each positioning board connected to one of the two lateral plates such that the first and second positioning boards are between the first and second lateral plates;

ii) a gear-set axle having three gears rotatably connected between the two positioning boards;

iii) two supporting boards, each having a first side connected to the first positioning board and a second side connected to the second positioning board; and c) a movable clamping seat belt having a plurality of clamping seats, the clamping seat belt engaging gears of the gearing device, each clamping seat having:

i) two recessed engaging portions on a front thereof;

ii) a hinge on a back thereof pivotally connecting each clamping seat to an adjacent clamping seat; and iii) a plurality of stubs extending from the back of the clamping seat and engaging gears of the gearing device.

2. The electrically cycling multi-media CD rack according to claim 1, wherein the gearing device includes a motor, and a connecting gear connecting the gear-set axle to the motor.

3. The electrically cycling multi-media CD rack according to claim 2, further comprising a power switch connected to the main framework for activating the motor.

* * * * *